Feb. 3, 1959 G. F. COUCH 2,871,801
QUICK WHEEL CHANGE TRUCK
Filed Jan. 18, 1957 2 Sheets-Sheet 1
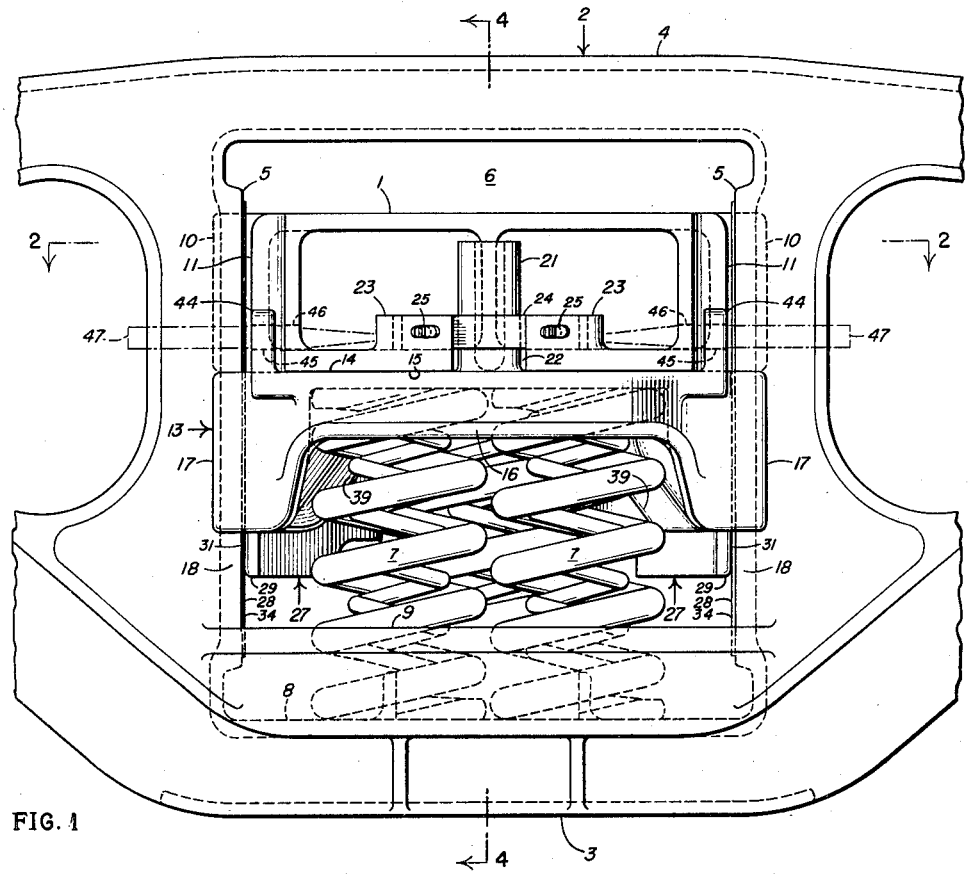
FIG. 1
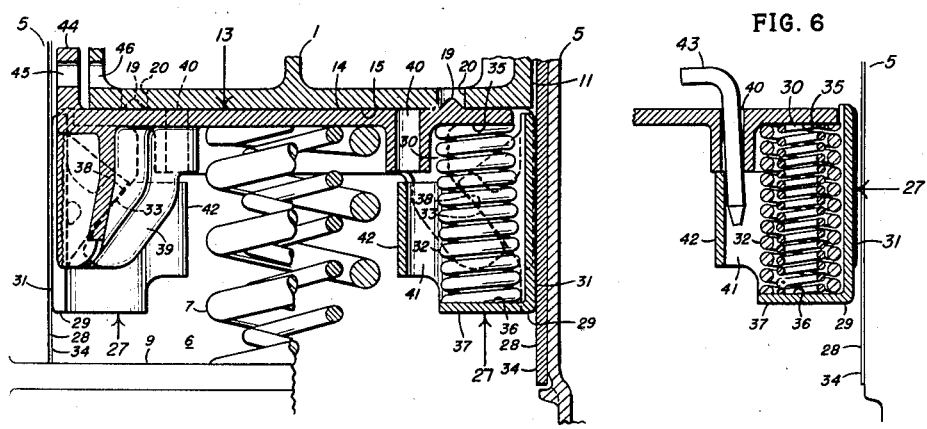
FIG. 5
FIG. 6
Inventor:
Glenn F. Couch
By Wilmer Mechlin
his Attorney Feb. 3, 1959  G. F. COUCH  2,871,801
QUICK WHEEL CHANGE TRUCK
Filed Jan. 18, 1957  2 Sheets-Sheet 2

Inventor:
Glenn F. Couch
By Wilmer Mechlin
his Attorney

United States Patent Office 2,871,801
Patented Feb. 3, 1959

2,871,801

QUICK WHEEL CHANGE TRUCK

Glenn F. Couch, Bergen, N. Y., assignor to The Symington-Gould Corporation, Depew, N. Y., a corporation of Maryland Application January 18, 1957, Serial No. 634,927

11 Claims. (Cl. 105—197)

This invention relates to railway trucks and has for its primary object the provision of a railway truck having a connection between side frame and bolster whereby a side frame may be removed from a bolster without disturbing the bolster supporting springs and related structure, thereby particularly adapting the truck for a quick wheel change.

Another object of the invention is to provide a quick wheel change truck wherein inboard movement of the bolster relative to either side frame is restrained by a spring cap releasably connected to the bolster and carrying snubbing means reacting against the side frame, whereby the spring cap serves both to dampen any periodic oscillations in the supporting springs and to hold itself and the supporting springs in assembled relation on removal of the bolster.

An additional object of the invention is to provide a quick wheel change truck wherein a spring cap carrying snubbing means and held thereby against vertical movement on removal of the bolster, is connectible for upward movement with the bolster on lifting thereof to facilitate removal of one or more of the springs of the supporting spring group.

A further object of the invention is to provide a quick wheel change truck wherein snubbing means carried by a spring cap and frictionally engaging said frame are enabled to be retracted to permit installation or removal of the cap member.

Other objects and advantages of the invention will appear hereinafter in the detailed description, be particularly pointed out in the appended claims and be illustrated in the accompanying drawings, in which:

Figure 1 is a fragmentary side elevational view of a preferred embodiment of the improved quick wheel change truck of the present invention;

Figure 5 is a fragmentary vertical sectional view taken along the lines 5—5 of Figure 2; and Figure 6 is a fragmentary vertical sectional view taken along the lines 6—6 of Figure 2.

Figure 3:
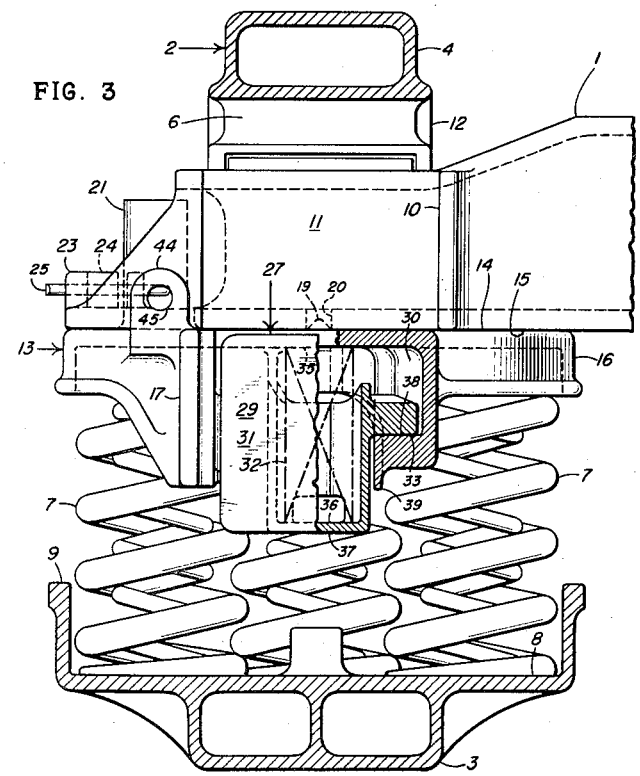
Figure 3 is a vertical sectional view taken along the lines 3—3 of Figure 2, with portions broken away and shown in section to more clearly illustrate certain of the details of construction.
Figure 4:
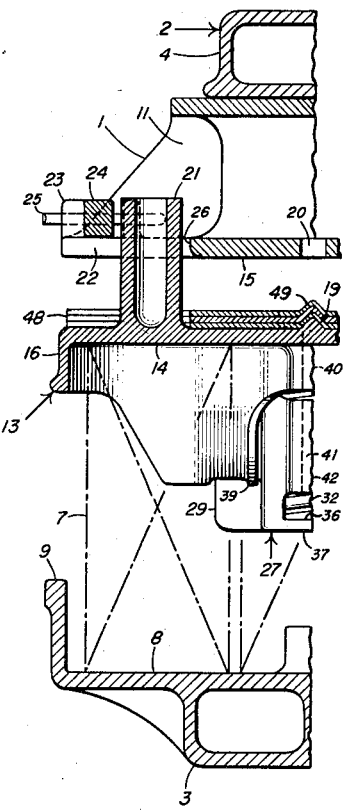
Figure 4 is a fragmentary vertical sectional view taken in the plane of the lines 4—4 of Figure 1.
Figure 2:
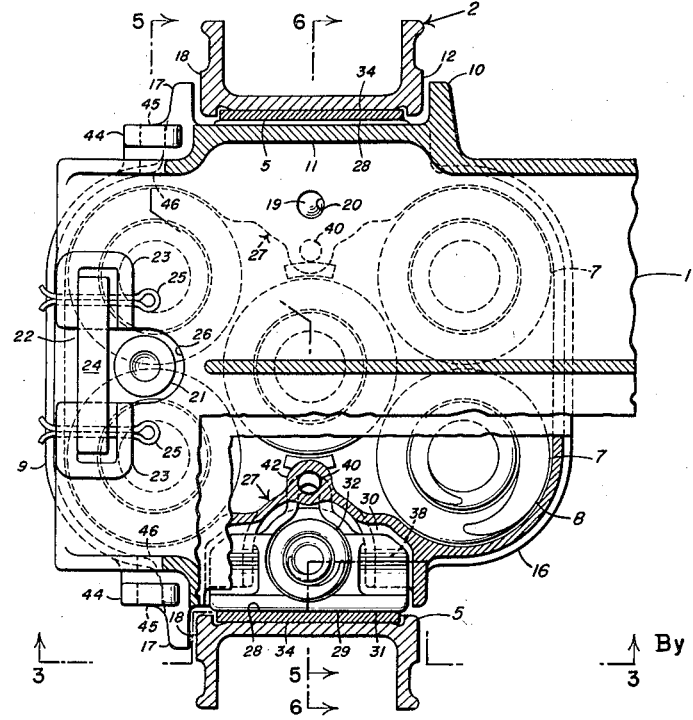
Figure 2 is a fragmentary horizontal sectional view taken along the lines 2—2 of Figure 1, with portions broken away and shown in section to more clearly illustrate certain of the details of construction.

Referring now in detail to the drawings, in which like reference characters designate like parts, the improved quick wheel change truck of the present invention is comprised of a bolster 1 supported at its opposite ends by a pair of side frames 2. Since the side frames are identical and may be of either the integral journal box or jaw type, the illustrated central portion of one of the side frames will suffice for an understanding of the invention.

The illustrated side frame 2 has a tension member 3 and a compression member 4, connected intermediate their ends by guide columns or uprights 5, the latter being spaced longitudinally of the side frame and including with the tension and compression members a bolster or window opening 6 in which is received the adjoining end of the bolster 1. Also within the window opening 6 and supported on the tension member 3 are a group of bolster-supporting springs 7 which here rest in a basket-type spring seat 8 formed integrally with the tension member and bounded outboard and inboard of the guide columns 5 by an upstanding rib or lip 9.

The extent to which the bolster 1 can project into the window opening 6 and move outboardly or outwardly laterally or transversely of the side frame 2 is determined in the usual manner by guide or stop lugs 10 integral with and outstanding from opposite sides or side walls 11 of the bolster and each overlapping and engageable with the inboard side 12 of one of the guide columns 5. However, unlike the conventional bolster, that of this invention is not in itself adapted to limit or restrain movement of the bolster inboard or inwardly transversely or laterally of the side frame. Instead, it depends for such restraint on a spring cap or top spring plate 13 interposed between the bolster and the supporting springs 7 and having a substantially flat top or upper wall 14 directly engaging or bearing against the bottom wall 15 of the bolster. The spring cap pockets the upper ends of the supporting springs 7, preferably being provided for this purpose with a peripheral skirt or flange 16 downstanding from its upper wall 14 and carrying as integral parts thereof a pair of outboard guide or stop lugs 17, one at either side and each confronting the outboard face 18 of one of the guide columns 5.

With restraint imposed on outboard movement of the bolster 1 by its inboard guide lugs 10 and on inboard movement of the cap member 13 by its outboard guide lugs 17, it is only necessary to connect the bolster and cap member against relative movement laterally or transversely of the side frame 2 to hold the end of the bolster in position within the window opening 6. Provision is made for fixing the position of the spring cap 13 relative to the bolster 1 by a plurality of spaced positioning lugs or nibs 19 upstanding from the upper wall 14 of the spring cap and each seatable in a socket 20 in the bottom wall 15 of the bolster. While these positioning means normally are effective to restrain relative lateral movement of the bolster and cap member, since these members are urged together vertically by the weight of the car body (not shown) on the bolster and the upward force of the springs 7 on the cap member, they alone would not ensure against such movement under all service conditions. Consequently, additional connecting means are here provided to safeguard against or limit relative lateral movement of the bolster and spring cap in case of limited relative vertical movement therebetween under more severe service conditions.

In the illustrated embodiment, the desired releasable safety connection is in the form of a post, spud or prong 21 integral with and upstanding from the upper wall 14 of the cap member and seating in and projecting or extending through a slot or recess 22 in and opening onto the outboard end of the bottom wall 15 of the bolster. Upstanding from this bottom wall at each side of the slot 22 is a pair of apertured lugs 23, the lugs of each pair being spaced longitudinally of the bolster and so positioned relative thereto as to receive between the lugs one end of a safety block or bar 24 spanning or straddling the slot 22 outboardly of the post 21. Seating at each end between one of the pairs of lugs 23 and releasably locked thereto by suitable means, such as the illustrated cotter pins 25, the bar 24, so long as it is in place, cooperates with the portion of the bottom wall of the bolster defining the inner end 26 of the slot 22 and with the post 21 contained therebetween and of sufficient vertical extent to encompass any possible relative vertical movement of the bolster and spring cap, to restrain these members against undesired relative lateral movement under all service conditions.

Of prime importance in the quick wheel change truck of the present invention is its snubbing means. Conventionally, the snubbing means by which the oscillations of the bolster supporting springs under vertical forces are dampened to prevent them from becoming periodic, are carried by or react against the bolster. Too, the frictional contact between the snubbing means and the bolster or side frame generally occurs over the upper portion of the bolster opening, this being necessary to permit enlargement of the lower portion of the opening so as to accommodate the usual bolster with its integral outboard and inboard guide lugs during insertion and removal. However, in accordance with the present invention, the guide columns 5 can and preferably do extend substantially the height of the bolster opening 6, this being possible because neither the outboard nor the inboard guide lugs, 10 and 17, need pass through the bolster opening during assembly or disassembly of the truck. Also, unconventionally, the plurality of snubbing means 27 for snubbing the periodicity of the spring 7 are carried below the level of the bolster 1 by the spring cap 13, one at each side of the cap, and each reacts against one of the pair of inner, confronting or longitudinally facing, vertically directed friction surfaces 28, each on or carried by one of the guide columns 5 and together defining the opposite sides of the bolster opening 6.

Each of the pair of snubbing means 27 includes a friction shoe 29 received, fitting or seating in a pocket 30 in its side of the spring cap 13 and having a vertically directed friction face 31 engageable with the friction surface 28 on the adjoining guide column. Each snubbing means also includes coil or other spring means 32 in the pocket 30 and acting on the associated shoe 29 and against the spring cap for urging the shoe outwardly along a surface or surfaces 33 on the spring cap and the friction faces 31 of the shoe into frictional engagement with the associated of the friction surface 28, the friction surfaces preferably being on hardened wear plates or liners 34 carried by the guide columns rather than on the columns themselves.

In the disclosed embodiment, each of the friction shoes 29 is a wedge, and the associated spring means 32 is a vertically directed spring acting between a pair of vertically spaced, horizontally directed spring seats, one 35 on the upper wall 14 of the spring cap and facing downwardly and the other 36 on a bottom shelf 37 of the shoe and facing upwardly. To convert the vertical action of its spring 32 into a horizontal force urging it into frictional engagement with the adjoining guide column, each of the shoes or wedges 29 has a pair of upwardly and inwardly inclined wedging faces 38 and spaced by the spring 32 and one at either of the inboard and outboard sides of the shoe. The cooperating surfaces 33 on the spring cap on which each shoe rides are a pair of wedging surfaces, correspondingly spaced, inclined oppositely to and each engaging one of the wedging faces 38, the friction surfaces 33 conveniently being carried by flanges 39 integral with and depending from the skirt 16 of the spring cap, one at either side of each pocket 30.

With its pair of friction shoes 29 frictionally engaging the guide columns 5, the spring cap 13 is restrained against vertical movement relative to the side frame 2 and thus enabled to maintain its vertical position and hold itself and the supporting springs 7 in assembled relation when relieved of the weight imposed by the bolster 1. Consequently, removal of the side frame for a quick wheel change or other purpose, merely entails removing the safety block 24 and jacking up the bolster sufficiently for the positioning lugs or nibs 19 to clear their sockets 20 whereupon the side frame may be slid horizontally off the bolster. However, this ability of the spring cap 13 to hold itself in place is disadvantageous in installation and removal of the spring cap, as well as when it is necessary to raise the spring cap, as for replacing one or more broken supporting springs 7.

Both of the above disadvantages are readily avoided, installation and removal of the spring cap being avoidable by the provision of a pair of vertically directed pin holes 40 in the spring cap 13, each aligning, when the shoes are retracted in their pockets 30, with a correspondingly directed opening or hole 41 in each of the shoes, the openings 41 each conveniently being provided by a vertically directed web 42 instanding from the friction surface 28 of the shoe and embracing or encircling the associated of the springs 32. With such alignable assembly openings 40 and 41, the shoes may be pressed or pinched inwardly sufficiently to align the holes and assembly or holding pins 43 may then be dropped into the openings to hold the shoes temporarily in retracted position in their pockets 30, this procedure being followed both in initial assembly to hold the spring cap 13 and the snubbing means 27 in assembled relation during shipment and installation and when the spring cap is to be removed from the bolster opening 6. Jacking up of the spring cap 13 is best accomplishable by making the spring cap connectable to the bolster 1 so that the spring cap and bolster will move upwardly as a unit when the latter is jacked up. The desired connectability is obtained in the disclosed embodiment by the provision of a pair of ears 44 upstanding from the upper wall 14 of the spring cap 13 and each confronting and spaced outwardly transversely of the bolster 1 from one of the latter's side walls 11. Transversely directed apertures 45 in these ears, each aligning with a correspondingly directed aperture or hole 46 in the confronting of the side walls 11 for receiving a connecting pin 47 enables the spring cap 13 and bolster 1 to be connected by such pins for upward movement in unison, whenever desired.

One other departure from the conventional in the truck of this invention is the method of shimming to raise the height of the bolster 1 should this prove necessary. Instead of shimming between the supporting springs 7 and their spring seat 8 on the tension member 3 of the sides frame 2, one or more shims 48 may readily be inserted between the spring cap 13 and the bolster. As shown, the shims 48 should have positioning nibs 49 stamped in them to nest with the positioning nibs 19 and sockets 20 on the spring cap 13 and bolster 1, so as not to interfere with the lateral relative positioning of the cap member and bolster. As desired, the shims 48 may either by split or slotted in correspondence with the slot 22 in the bottom wall 15 of the bolster to accommodate the upstanding post 21 on the spring cap.

From the above detailed description, it will be apparent that there has been provided an improved quick wheel change truck which, by use of a spring cap carrying snubbing means, enables a side frame to be pulled off of a bolster without disturbing either the spring cap or the supporting springs. It should be understood that the described and disclosed embodiment is merely exemplary of the invention and that all modifications are intended to be included which do not depart from either the spirit of the invention or the scope of the appended claims.

Having described my invention, what I claim is:

1. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said outboard guide lugs cooperating with said inboard guide lugs for limiting movement of said bolster transversely of said side frame, and snubbing means at opposite sides of and movable vertically with said spring cap and each frictionally engaging one of a pair of friction surfaces carried by said uprights and defining sides of said opening.

2. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with inboard faces of said uprights, said inboard and outboard guide lugs cooperating for limiting movement of said bolster transversely of said side frame, and snubbing means carried by said spring cap at opposite sides thereof and below said bolster, each of said snubbing means frictionally engaging one of a pair of vertically directed surfaces carried by said uprights and defining sides of said opening.

3. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said inboard and outboard guide lugs cooperating for limiting movement of said bolster transversely of said side frame, a pair of confronting vertically directed friction surfaces each carried by one of said uprights, said friction surfaces extending substantially the height of and defining opposite sides of said opening, and a plurality of snubbing means at opposite sides of and movable vertically with said spring cap and each frictionally engageable with one of said friction surfaces, said snubbing means cooperating with said friction surfaces to hold said spring cap and spring means in assembled relation in said opening on removal of said bolster therefrom.

4. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said inboard and outboard guide lugs cooperating for limiting movement of said bolster transversely of said side frame, a plurality of friction shoes each received in one of a plurality of pockets in opposite sides of said spring cap, and spring means in each pocket and acting between the spring cap and associated shoe for urging said shoe into frictional engagement with one of a pair of confronting friction surfaces carried by said uprights and defining opposite sides of said opening.

5. In a railway truck, the combination with a side frame having tension and compression members and spaced uprights connecting and including with said members a bolster opening and supporting spring means in said opening and supported on said tension member, of a bolster having an end projecting into said opening above and supported on said spring means, guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said inboard and outboard guide lugs cooperating for limiting movement of said bolster transversely of said side frame, a plurality of friction shoes below the level of said bolster and each received in one of a plurality of pockets in opposite sides of said spring cap, and spring means in each pocket and acting between the spring cap and associated shoe for urging said shoe into frictional engagement with one of a pair of confronting friction surfaces carried by said uprights and defining opposite sides of said opening.

6. In a railway truck, the combination with a side frame having tension and compression members and spaced uprights connecting and including with said members a bolster opening and supporting spring means in said opening and supported on said tension member, of a bolster having an end projecting into said opening above and supported on said spring means, guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said inboard and outboard guide lugs cooperating for limiting movement of said bolster transversely of said side frame, a plurality of friction shoes below the level of said bolster and each received in one of a plurality of pockets in opposite sides of said spring cap, spring means in each pocket and acting between the spring cap and associated shoe for urging said shoe into frictional engagement with one of a pair of confronting friction surfaces carried by said uprights and defining opposite sides of said opening, and a plurality of openings in said spring cap and each alignable with an opening in one of said shoes on retraction of said shoe in the related of said pockets for receiving means to hold said shoes temporarily in retracted position.

7. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said inboard and outboard guide lugs cooperating for limiting movement of said bolster transversely of said side frame, means upstanding from said spring cap and extending through a bottom wall of said bolster, releasable means carried by said bolster and cooperating with said upstanding means for limiting lateral relative movement of said spring cap and bolster on upward movement of said bolster relative to said spring cap, and snubbing means at opposite sides of and movable vertically with said spring cap and each frictionally engaging one of a pair of friction surfaces carried by said uprights and defining sides of said opening.

8. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said inboard and outboard guide lugs cooperating for limiting movement of said bolster transversely of said side frame, means upstanding from said spring cap and having apertures alignable with apertures in sides of said bolster for receiving connecting means to enable said spring cap to move upwardly with said bolster, and snubbing means at opposite sides of and movable vertically with said spring cap and each frictionally engaging one of a pair of friction surfaces carried by said uprights and defining sides of said opening.

9. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said inboard and outboard guide lugs cooperating for limiting movement of said bolster transversely of said side frame, said spring cap being connectable for movement upward with said bolster, and snubbing means at opposite sides of and movable vertically with said spring cap and each frictionally engaging one of a pair of friction surfaces carried by said uprights and defining sides of said opening.

10. In a railway truck, the combination with a side frame having tension and compression members and spaced uprights connecting and including with said members a bolster opening and supporting spring means in said opening and supported on said tension member, of a bolster having an end projecting into said opening above and supported on said spring means, inboard guide lugs outstanding from sides of said bolster and engageable with inboard faces of said uprights, a spring cap interposed between said spring means and bolster and connected for movement laterally with said bolster, outboard guide lugs carried by said spring cap and engageable with outboard faces of said uprights, said outboard guide lugs cooperating with said inboard guide lugs for limiting movement of said bolster transversely of said side frame, a post upstanding from said spring cap and extending through a slot in and opening onto an outboard end of a bottom wall of said bolster, releasable means carried by said bottom wall outboardly of said post and cooperating with said bottom wall and post for limiting relative horizontal movement of said spring cap and bolster on limited relative vertical movement therebetween, and snubbing means at opposite sides of and movable vertically with said spring cap and each frictionally engaging one of a pair of friction surfaces carried by said uprights and defining sides of said opening.

11. In a railway truck, the combination with a side frame having tension and compression members and spaced uprights connecting and including with said members a bolster opening and supporting spring means in said opening and supported on said tension member, of a bolster having an end received in said opening and supported on said spring means, limiting means carried by said bolster and engageable with an inboard face of said side frame, a spring cap interposed between said spring means and bolster and normally connected for horizontal movement with said bolster, limiting means carried by said spring cap and engageable with an outboard face of said side frame, said limiting means cooperating for limiting transverse movement of said bolster relative to said side frame, a pair of longitudinally spaced friction surfaces each carried by one of said uprights and together defining opposite sides of said opening, a plurality of pockets in said spring cap below said bolster and each opening onto one of said friction surfaces, a wedge in each of said pockets and having a vertically directed friction face, and spring means in each of said pockets and acting between said spring cap and a related wedge for urging the friction face thereof into frictional engagement with the adjoining of said friction surfaces.

References Cited in the file of this patent

UNITED STATES PATENTS

| | | |
|---|---|---|
| 1,894,386 | Webb | Jan. 17, 1933 |
| 2,557,768 | Schlegel | June 19, 1951 |
| 2,621,611 | Barrows | Dec. 16, 1952 |